United States Patent Office

2,914,504
Patented Nov. 24, 1959

2,914,504

THERMOSETTING AMINOPLAST RESINS CURED WITH AMINO ACID CATALYST

Walter Metzger and Helmut Meis, Letmathe, Westphalia, Germany, assignors to Rütgerswerke-Aktiengesellschaft, Frankfurt, Germany No Drawing. Application June 1, 1954
Serial No. 433,816

Claims priority, application Germany June 3, 1953

13 Claims. (Cl. 260—45.2)

This invention relates to the production of thermosetting aminoplast resins and their compositions and has particular relation to the production of resins and resin compositions of this type, which are stable on storage, but show a high rate of curing or hardening when subjected to the action of heat or heat and pressure.

It has been known that resinous urea-formaldehyde condensation products can be cured or hardened by exposing them to the action of heat. However, this requires the application of unduly high temperatures and long curing periods. Therefore, so-called accelerators of curing or hardening have been generally used in practice. As the urea resins require an acid reaction for hardening, such accelerators of curing consist of acids or acid-forming compounds. Urea-formaldehyde condensation products and molding compositions containing them, are not capable of storage, in the presence of such accelerators, because the addition of acids or the like directly causes the hardening process to start. In view of the fact that in commercial practice resinous products and compositions are required, which can be stored for months or years without undue change, but, on the other hand, can be hardened quickly at elevated temperature, e.g. during molding, the use of so-called "latent accelerators or hardening" has been suggested. These are substances which act only under predetermined conditions, i.e. upon the action of heat, but are substantially indifferent at normal room temperature.

A considerable number of such substances have been suggested previously. Examples of these previously suggested substances are acid anhydrides or esters, the acid character of which becomes active only by a reaction occurring at elevated temperature and salts, the alkaline component of which reacts with the resin and thereby splits off the acid component during hardening at elevated temperature, such as ammonium or guanidine salts of strong acids, e.g. ammonium chloride. The use of organic, halogen-containing compounds, which are decomposed upon heating and thereby split off a hydrogen halide, such as dichlorhydrin, has also been suggested. According to another suggestion, oxidizing agents, e.g. peroxides, are added to urea-formaldehyde resin compositions in order to oxidize formaldehyde to formic acid, during the hardening process.

However, the above mentioned accelerators of hardening do not meet all requirements of the practice. For example, the use of a considerable amount of an electrolyte is undesirable, because it results in impairment of the water proofness and electric characteristics of the finished products. Moreover, strong acids attack the molding tools. The addition of toxic or physiologically undesirable materials limits the use of finished products, because, for example, dishes or drinking sets cannot be manufactured from compositions containing such ingredients. Another requirement is that the flowing capacity and moldability of the molding composition should not be adversely affected by the accelerator of hardening. Finally, a satisfactory latent accelerator of curing must exercise its effect during hardening within a predetermined period of time and its presence must result in exactly predetermined pH values, so that the finished product is characterized by optimum properties.

The main object of the present invention is the use in combination with aminoplast resin products, particularly aminoplast resin molding compositions, of novel accelerators of hardening or curing, which avoid the above mentioned disadvantages and satisfactorily meet the requirements of practice.

It has been found that this object can be attained by using in combination with aminoplast resins, particularly urea-formaldehyde resins and melamine-formaldehyde resins, as accelerators of hardening, amino acids. It has been found that the latter have an accelerating affect on the hardening of resinous condensation products obtained, on the one hand, from urea, melamine and their derivatives, used individually or in mixture with each other, and, on the other hand, from aldehydes, preferably formaldehyde. The amino acids have a similar effect also on the hardening of other thermosetting aminoplast resins.

In carrying out the present invention, the amino acids are used, as a rule, in an amount of 0.02% to 8%, preferably 0.2 to 2%, based on the amount of the resin. When added to molding compositions, the amount of amino acids is calculated correspondingly. For example to 100 parts of a conventional urea-formaldehyde molding composition containing about 50% of urea-formaldehyde resin and about 50% cellulose filler, 0.01–4 parts, preferably 0.1 to 1.0 part of the amino acid accelerators are added. The desired effect on the acceleration of hardening is obtained already by the addition of small amounts of amino acid, in general less than 0.6% based on the amount of resin. It is a particular advantage of the amino acids as latent accelerators of hardening according to the present invention that the acid effect of these substances, which have a neutral or alkaline reaction, becomes effective only after reaction with the aldehyde, particularly formaldehyde, or with the methylol groups of the urea resin. This reaction takes place substantially at elevated temperatures, for example during molding. The adverse effects of incorporating an electrolyte in the molding mass, such as corrosion of the mold, and reduced water proofness of the final products, do not occur, because, during hardening, the amino acids are built in in the resinous complex. A further advantage consists in that the amino acids are completely non-toxic. Unexpectedly, the use of amino acids according to the present invention has also the effect of considerably improving the flowing capacity and moldability of aminoplast molding compositions containing them.

This effect makes it possible to use urea resins of a higher degree of condensation and this results in improved properties of the finished products. Moreover, by the use of amino acids according to the present invention, a "controlled" hardening effect is obtained, i.e. the occurrence of the hardening effect at a predetermined point of time and with a pH value in the finished product, which can be exactly predetermined.

In carrying out the present invention aliphatic as well as aromatic amino acids or polyamino acids can be used, e.g. glycine, alanin, lysine, amino-benzoic acids, and the like. Esters, amides, lactams and other derivatives of the amino acids can be also used, if these derivatives are decomposed under hardening or molding conditions with the formation of the free amino acid.

In order to obtain an adjustable hardening effect and a particularly good plastic flow of the molding composition, the amino acids are used in mixture with suitable buffer substances. In this connection it is preferred to combine the amino acids with organic bases, e.g. hexamethylenetetramine, primary or secondary alkyl or aryl amines, guanidine carbonate, and the like. As these bases participate in the condensation of the resinous complex during the hardening process, their use does not result in any additional consumption of acid. It is, therefore, possible to obtain a considerable change of the pH value by a rather small amount of the accelerator of hardening. Moreover, such buffering results in a certain delay of the hardening effect during the molding process, so that the initially desirable "plastic flow" is secured. The buffer substances are preferably used in an amount of from 0.02% to 6.0% based on the weight of the resin.

By suitable selection of the amine acids and buffer substances and of the proportions in which they are used, the hardening velocity and the flowing properties of the molding composition can be widely varied. It has been found appropriate to incorporate the latent accelerators of hardening during coloring of the molding material by incorporation of the coloring substances by grinding, so that no particular process step is necessary for the incorporation of the accelerators. Thus the accelerator is incorporated with the dried, powdered resin during this grinding.

The process of the invention is not limited to the preparation of quick-hardening molding compositions and can be applied substantially in the manner described above also in the manufacture of casting resins, resins for lacquers, resins for impregnation purposes, adhesives, binding agents for laminated materials, in which aminoplast resins, particularly urea-formaldehyde resins or melamine-formaldehyde resins, or resins obtained with the used of other aldehydes or with derivatives of urea or melamine, or mixtures of these materials.

Example 1

A slow-hardening commercial urea-formaldehyde molding composition prepared according to conventional methods was mixed with 0.6% amino acetic acid and 0.07% hexamethylenetetramine, based on the weight of the molding composition, by grinding in a ball mill for about 2 to 3 hours. Sample beakers were molded from the resulting mixture, as well as from the slow-hardening molding composition used as starting material, under equal molding conditions, i.e. at a molding temperature of 145° to 150° C. and a molding pressure of 250 kg./cm.², with varying molding periods. Parts of the beakers thus produced were finely ground, suspended in water and the pH value was determined. The following figures represent the changes of the pH values obtained with increasing molding periods:

| Molding period, minutes | 0 | ½ | 1 | 1½ | 2 | 3 | 4 |
|---|---|---|---|---|---|---|---|
| pH-value: | | | | | | | |
| (a) without accelerator | 6.80 | 6.80 | 6.56 | 6.46 | 6.40 | 6.22 | 6.40 |
| (b) with accelerator and buffer substance | 6.80 | 5.50 | 5.30 | 5.24 | 5.30 | 5.30 | 5.32 |

It has been found that the period required for hardening amounted to 50–60 seconds per mm. of wall thickness in the untreated molding composition and to 20–30 seconds in the molding composition containing the accelerator and buffer.

The urea-formaldehyde molding composition used as starting material in this example contained 50% of a urea-formaldehyde resin prepared in conventional manner e.g. from 1 mol urea and 1.3 to 2.0 mol of formaldehyde and 50% of alpha-cellulose filler, with the addition of other conventional ingredients, e.g. color pigments, lubricants and, if desired, plasticizers.

The accelerators and buffer substances of the present invention can be used in a similar manner, under similar conditions and with similar effects, in connection with other thermosetting aminoplast resins, such as conventional melamine-formaldehyde resins, urea-formaldehyde resins, in which instead of urea, or in mixture with it, urea-derivatives e.g. ethyl urea or ethanol urea are used, and urea resins in which in mixture with formaldehyde acetaldehyde is used.

Example 2

A slow-hardening commercial urea-formaldehyde molding composition as described in the above Example 1, is mixed with 0.6% amino acetic acid and is then molded in the manner described in said example.

Example 3

In the above Example 1, 0.6% of aminoacetic acid and 0.07% of normal primary butylamine, based on the weight of the molding composition are used as accelerating agent and buffer, respectively. The other steps and conditions are similar to those of Example 1.

Example 4

In the above Examples 1–3, 0.75% of alanin, based on the weight of the molding composition, is substituted for the amino acetic acid.

Example 5

In the above Example 1, a mixture of 0.3% amino acetic acid and 0.4% alanin, based on the weight of the molding composition, is used instead of 0.6% amino acetic acid.

Example 6

To a conventional urea-formaldehyde resin solution used for impregnating paper, 1.0% of amino acetic acid, based on the weight of dissolved resin, is added and the solution is used and the impregnated paper treated in conventional manner.

Example 7

In a conventional commercial thermosetting melamine-formaldehyde molding composition containing alpha-cellulose as filling material, 1.0% amino acetic acid and 0.1% hexamethylene tetramine, based on the weight of the melamine-formaldehyde resin present on the molding composition, are incorporated. The resulting product is molded in conventional manner.

Example 8

Dry, hot-setting urea-formaldehyde resin is dissolved in water and to the solution 1.4% of amino acetic acid and 0.15% of hexamethylene tetramine, based on the weight of the dissolved resin are added. The solution is used as adhesive, or as a binder in the manufacture of laminated products.

Example 9

To the solution of a conventional thermosetting melamine-formaldehyde resin in butanol, 1.5% of lysine and 0.15% of hexamethylene tetramine, based on the weight of the dissolved resin, are added. The solution can be used for surface coatings, or, if sufficiently concentrated, as casting resin.

Example 10

To a thermosetting melamine-formaldehyde solution prepared in conventional manner from melamine and aqueous formaldehyde solution by heating and partial evaporation of water 1.5% of lysine, based on the weight of the dissolved resin, are added. The solution can be used as impregnating and binding agent in the manufacture of plywood.

Other accelerators and buffer substances of the present invention can be used in a manner, under conditions, and with effects similar to those described above, in connection with other thermosetting aminoplast resins, such as conventional melamine-formaldehyde resins, resins prepared from formaldehyde, urea and substituted ureas, and mixtures of different aminoplast resins. The resin compositions may contain fillers other than cellulose, e.g. asbestos.

Further examples of amino acids which can be used in carrying out the invention are: serine, cystine, cysteine, phenylalanine, tyrosine, tryptophan, histidine, alpha-amino-butyric acid, methionine, leucine, arginine, aspartic acid, glutamic acid, proline, asparagine, and the polyamino acids: diamino valeric acid and alpha-epsilon-diamino caproic acid. Mixtures of two or more amino acids can also be used. Derivatives of amino acids which can be used, are leucine ethylester, sarcosine and p-aminobenzoyl glutamic acid. As further examples of buffers, primary and secondary lower alkyl amines are mentioned.

The term "aminoplast resins" or "aminoplasts" is used in the present application to denote synthetic resins obtained by condensation of amino or amido compounds with aldehydes, particularly formaldehyde.

The parts and percent mentioned are by weight, if not otherwise stated.

It will be understood from the above that this invention is not limited to specific steps, materials, conditions and other details specifically disclosed above and can be carried out with various modifications. For example, the invention can be applied to any of the aminoplast resins, including modified aminoplast resins, such as urea-formaldehyde resins modified by a phenol, and to any aminoplast resin product, which term includes the resins proper, as well as their compositions, such as solutions, molding compositions and the like. Furthermore, any of the amino-acids and of the buffer substances or mixtures of aminoacids and/or buffers can be used. It will be also understood that the buffer substances are organic bases which are capable of participating in condensation of the resin forming ingredients, e.g. urea and formaldehyde.

The above outlined and other modifications can be made without departing from the scope of the invention as defined in the appended claims.

What is claimed is:

1. A composition comprising an acid-curing thermosetting resin selected from the group consisting of urea-formaldehyde resins and melamine-formaldehyde resins, and, as a latent-curing catalyst, an amino acid in an amount of 0.2–8.0% based on the weight of the resin, said catalyst being incorporated in said resin by mixing the catalyst with the dried and powdered resin, said amino acid being selected from the group consisting of aminoacetic acid, alanine, lysine, serine, cystine, cysteine, phenyl alanine, tyrosin, tryptophan, histidine, alpha-amino-butyric acid, methionine, leucine, arginine, aspartic acid, glutamic acid, proline, asparagine, diamino valeric acid and alpha-epsilon-diamino-caproic acid.

2. A composition comprising an acid-curing thermosetting resin selected from the group consisting of urea-formaldehyde resins and melamine-formaldehyde resins, and, as a latent-curing catalyst, an amino acid in an amount of 0.2–8.0% based on the weight of the resin, said catalyst being incorporated in said resin by mixing the catalyst with the dried and powdered resin, and, as a buffer substance, an organic base selected from the group consisting of hexamethylenetetramine and primary lower alkylamines, in the amount of 0.02–6.0% based on the weight of the resin, said amino acid and said organic base being incorporated in the resin by mixing them with the resin, said amino acid being selected from the group consisting of aminoacetic acid, alanine, lysine, serine, crystine, cysteine, phenyl alanine, tyrosin, tryptophan, histidine, alpha-amino-butyric acid, methionine, leucine, arginine, aspartic acid, glutamic acid, proline, asparagine, diamino valeric acid and alpha-epsilon-diamino-caproic acid.

3. A composition as claimed in claim 1, in which a mixture of urea-formaldehyde resins and melamine-formaldehyde resins is used.

4. A composition as claimed in claim 1, in which the resin is urea-formaldehyde resin.

5. A composition as claimed in claim 1, in which the resin is melamine-formaldehyde resin.

6. A composition as claimed in claim 1, in which the amino acid is present in an amount of 0.2–2.0% based on the weight of the resinous condensation product.

7. A composition as claimed in claim 2, in which the amino acid is present in an amount of 0.2–2.0% based on the weight of the resinous condensation product.

8. A composition as claimed in claim 1, in which the catalyst is amino-acetic acid.

9. A composition as claimed in claim 2, in which the catalyst is amino-acetic acid and the buffer substance is hexamethylenetetramine.

10. A composition as claimed in claim 1, consisting of a moldable mixture containing the resinous condensation product in mixture with a filler.

11. A composition as claimed in claim 1, said latent-curing catalyst comprising a mixture of amino acids.

12. A process for accelerating the hardening of thermosetting resins selected from the group consisting of urea-formaldehyde resins and melamine-formaldehyde resins, comprising the step of mixing said resins in dried condition with an amino acid, said amino acid being selected from the group consisting of aminoacetic acid, alanine, lysine, serine, cystine, cysteine, phenyl alanine, tyrosin, tryptophan, histidine, alpha-amino-butyric acid, methionine, leucine, arginine, aspartic acid, glutamic acid, proline, asparagine, diamino valeric acid and alpha-epsilon-diamino-caproic acid.

13. A process for accelerating the hardening of thermosetting resins selected from the group consisting of urea-formaldehyde resins and melamine-formaldehyde resins, comprising the step of mixing said resins in dried condition with an amino acid and with a buffer substance consisting of an organic base selected from the group consisting of hexamethylene tetramine and primary lower alkyl amines, said amino acid being selected from the group consisting of aminoacetic acid, alanine, lysine, serine, cystine, cysteine, phenyl alanine, tyrosin, tryptophan, histidine, alpha-amino-butyric acid, methionine, leucine, arginine, aspartic acid, glutamic acid, proline, asparagine, diamino valeric acid and alpha-epsilon-diamino-caproic acid.

References Cited in the file of this patent
UNITED STATES PATENTS

| 2,322,566 | D'Alelio | June 22, 1943 |
| 2,377,868 | D'Alelio | June 12, 1945 |
| 2,384,367 | Cordier | Sept. 4, 1945 |
| 2,389,416 | D'Alelio | Nov. 20, 1945 |
| 2,601,666 | Niles | June 24, 1952 |
| 2,606,880 | Yourtee | Aug. 12, 1952 |
| 2,624,514 | Wilhousky | Jan. 6, 1953 |